Nov. 16, 1937.    W. W. TIMMIS ET AL    2,099,182
HEAT EXCHANGE SYSTEM
Filed April 17, 1934    3 Sheets-Sheet 1

INVENTORS
WILLIAM WALTER TIMMIS.
WILLIAM K. WALKER.
their ATTORNEY

Patented Nov. 16, 1937

2,099,182

UNITED STATES PATENT OFFICE 2,099,182

HEAT EXCHANGE SYSTEM

William Walter Timmis, Glen Cove, and William K. Walker, New York, N. Y., assignors to American Radiator Company, New York, N. Y., a corporation of New Jersey Application April 17, 1934, Serial No. 720,928

45 Claims. (Cl. 236—91)

Our invention relates to heat exchange systems comprising one or more heat exchange or heat emitting elements supplied with a fluent heating medium or other operating heat exchange fluid for controlling the temperature conditions in the spaces or rooms of buildings.

An object of the invention is to maintain the desired temperature relations between the heat exchange element or elements and the surrounding ambient by balancing a force constituting a proportionate measure of the heat exchange rate of an element at a value corresponding to the heat exchange rate desired, and controlling the supply of operating fluid to said element or elements in accordance with the variations or deviations of such force from its balanced value.

Another object of the invention is to render said force directly responsive to the variations in the temperature of such heat exchange element or radiator so that upon deviation of said force from balanced relation excessive swings in the temperature of the heat exchange element are prevented and a substantially constant room temperature is maintained.

Another object of the invention in one of its embodiments is to balance said force constituting the measure of the heat exchange rate of the heat exchange element at the desired heat exchange rate by an opposing force constituting a proportionate measure of the heat transfer rate through the walls of the building.

Further, said invention has for its object to establish the output or absorption rates of all the heat exchange elements of a group, and to maintain such rates at their determined values, by control of the output or absorption rate of one or more of said elements.

Further, said invention has for its object to provide a control which maintains the percentages or relative percentages of output of all the radiators of a group substantially the same, regardless of the temperature of the room in which any radiator is located.

Further, said invention has for its object to provide an improved system or apparatus for carrying out said method.

Other objects will in part be obvious, and in part be pointed out hereinafter.

To the attainment of the aforesaid objects and ends, our invention consists in the novel features of construction, and in the combination, connection and arrangement of parts, and in the steps constituting said method, hereinafter more fully described and then pointed out in the claims.

According to our method, a force is used which is proportional to and varies with the difference between the radiator temperature and the room temperature, and hence is substantially proportional to the radiator output. In order to maintain or reestablish a desired or predetermined radiator output, we control the supply of heating fluid or medium to the radiator upon variation of said force in either direction from a value corresponding to the desired output. For this purpose we preferably balance this first force with an opposing force capable of being adjusted or varied in value, either manually or automatically, as desired, to correspond with the output desired. Accordingly, whenever the first force becomes greater or less than the adjusted force, the resultant force is made to vary the supply of heating fluid to the radiator in a direction to balance or equalize said forces and hence to maintain or reestablish the radiator at the output corresponding to the value of the adjusted force. In the preferred embodiment of the invention, the first force is a potential drop in the circuit of a thermo-current generated by the temperature difference, and such potential drop is opposed or balanced by or made equal to the potential drop in a control circuit adjusted or varied in value to correspond with the output desired, the two forces coacting to vary the supply of heating fluid so as to maintain the two forces substantially equal and the radiator output corresponding thereto substantially constant.

According to our invention we vary the rate of heat supply in accordance with variation in rate of heat loss from the building, and maintain the radiator warmer than the room, and at an approximately mean temperature, to prevent a "cold 70°." The rate of heat emission or output from a radiator is approximately proportional to the difference between the radiator temperature and the temperature of the surrounding space or environment, and we therefore effect the rate control of the heat by a coordination of forces varied in accordance with the respective temperatures, the integration resulting from the coordination effecting the control of the heat supply in terms of "rate" or "output" instead of in terms of "temperature." In our invention we provide a method of control for taking immediate cognizance of the change in rate of heat flow through the walls of the building, i. e., we modify the radiator output setting in response to and as a function of variations in the difference in temperatures between the inside and the outside of the building, and preferably between the inner and outer surfaces of the building, or equivalent control cabin, and hence in direct proportion to the variations in heat loss which is indicative of the resultant of all the factors making up what is designated as "weather conditions" or "atmospheric conditions."

By introducing the average radiator temperature as a factor in our control, we are able to control the introduction of heat into the room at its source, so to speak, i. e., in response to the radiator output, which depends not only upon the room temperature and heat loss from the building, but also upon the character of the heat generating and distributing system. Hence by controlling the system in response to radiator output, compensation can be made in view of the conditions of heat delivery to the radiator and of heat loss from the building. The output of the radiator having been adjusted to the desired value, the control will be effective to maintain such output, irrespective of the character of heat generation, distribution and transfer, and by a suitable design of the system as a whole, including the various heat exchange elements of the system, adjustment of one element to maintain a predetermined output can be made effective to maintain the same outputs or relative outputs at the other elements.

The various steps constituting the method of our invention are fully set forth and rendered clear by reference to the accompanying drawings and following description thereof, in which drawings—

Figure 1:
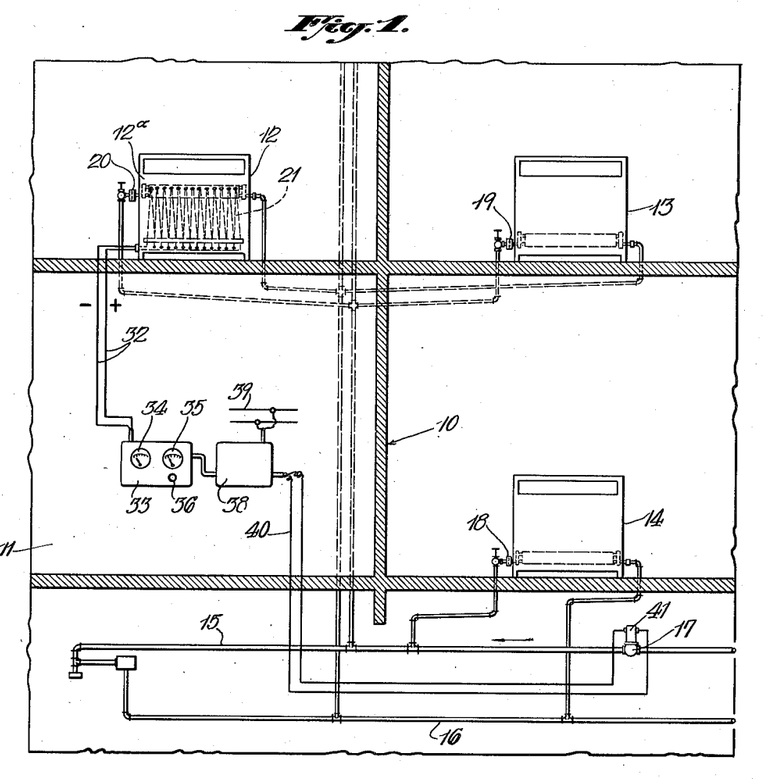
Figure 1 is an elevation of a heat exchange system constructed according to and embodying our said invention, and capable of use for carrying out the method of the invention.
Figure 2:
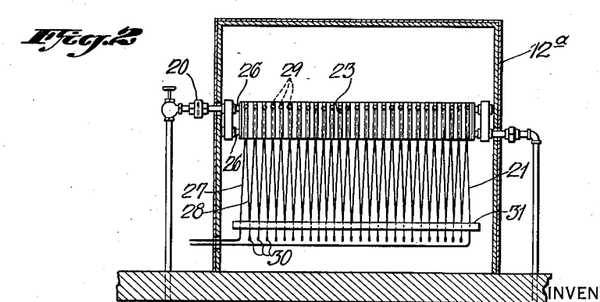
Fig. 2 is an elevation of a radiator, with the casing therefor in section, showing a thermopile in position thereon.
Figures 3, 4, 5, 6:
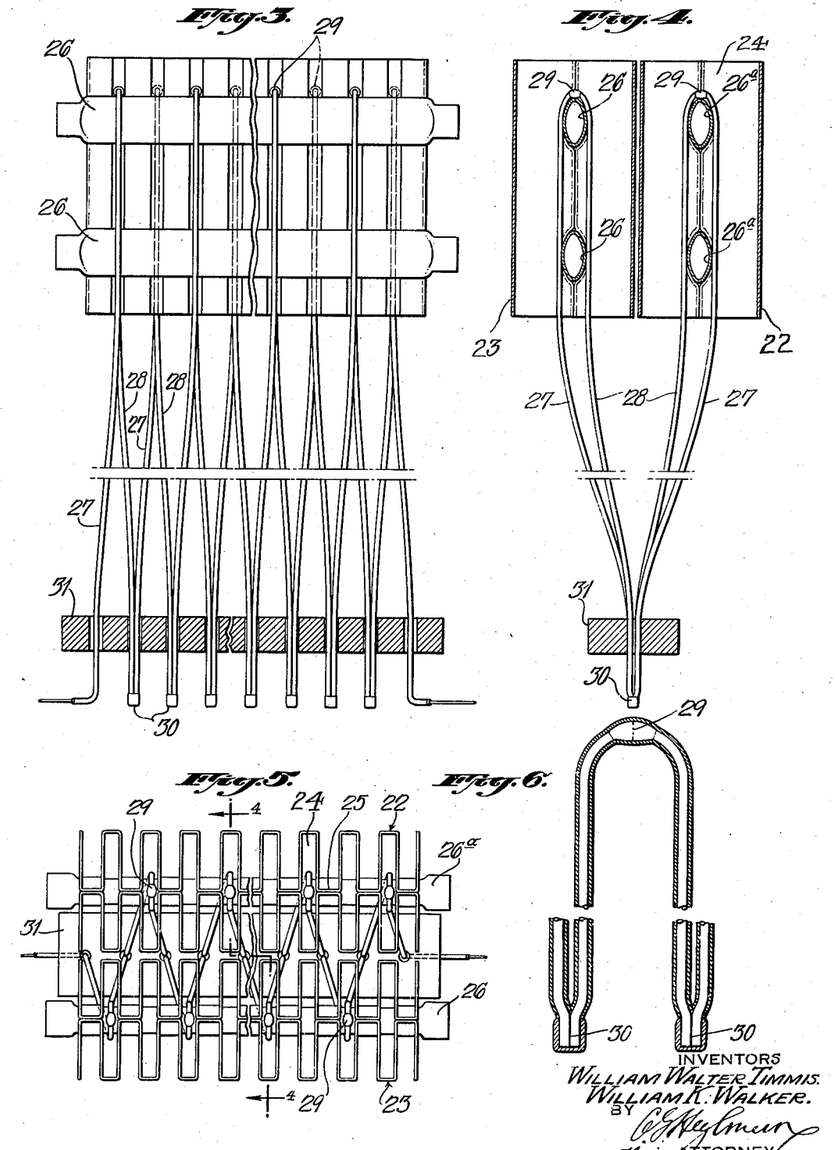
Fig. 3 is an enlarged elevation of a portion of said radiator and thermopile, the front portion of the radiator being omitted.
Fig. 4 is a section thereof on the line 4—4 of Fig. 5.
Fig. 5 is a plan thereof.
Fig. 6 is an enlarged view of a portion of the thermopile having the insulation thereon shown in section.

Referring to the drawings, Fig. 1, a portion of a building is indicated by the reference character 10 and comprises the rooms 11 containing the encased radiators 12, 13, and 14 connected through the supply connections of pipes 15 with a suitable source of steam supply or other heat exchange fluid. The system is also provided with the usual return connections or pipes 16.

The supply of steam or other heating agent to the radiators is controlled by a suitable controller, for example, the valve 17, which is preferably of the intermittently operated type which opens and shuts, in whole or in part, to start and stop the flow of heating fluid or steam, the steam pressure being regulated at the boiler to maintain the same at a substantially constant or uniform design pressure adequate for always insuring delivery of steam to all of the radiators in proper proportions, or the usual pressure reducing valve (not shown) for the same purpose may be interposed at the inlet side of the valve 17 when the steam is supplied from a public main.

While our invention is preferably employed in connection with a system employing steam as above described, it is also applicable to other systems employing operating fluids, such as hot water or air, to systems employing electrically heated radiators supplied with current from a suitable source, to systems in which the supply of steam is controlled by variation in the pressure thereof, and to vacuum systems. The invention is also applicable to cooling systems employing refrigerants as the circulating medium to be controlled.

The extent of radiating surface or capacity of each radiator 12, 13, and 14 is so designed with reference to the room size and exposure thereof as to supply sufficient heat to the room under the most severe condition of operation, such as in zero weather. For example, the radiator or amount of radiation for each room is so selected that when the outside temperature is at a given temperature, say, zero degrees Fahrenheit, and the radiator is supplied with steam at a temperature and in such quantity as to cause the radiator to operate at its full 100% capacity of designed heat output, the room or space will be heated to give a desired temperature, say 70° F. The several radiators are provided with orifices 18, 19, 20 sized to satisfy the requirements for steam and usually increasing in area with the distance of steam travel from the source of supply, and thus compensating for drop in steam pressure with the distance of travel and insuring adequate delivery of steam to the most remote radiator. The radiators, the supply and return, and the various branches thereof, should be designed in accordance with sound engineering practice.

At Figs. 1 to 6 we have shown one form of thermo-responsive means 21 embodying our invention and utilized in carrying out the method thereof for controlling the system as a function of the difference between the radiator temperature and the room temperature in the room in which the control radiator or heat exchange element is located. As an example, we have shown the thermo-responsive means 21 associated with a control radiator 12 of the convector type enclosed in a casing 12ª, although said means may be mounted upon a radiator of other types. The type of radiator shown comprises a sheet metal structure including horizontally spaced sets 22 and 23 of open-ended air passages 24 connected together by the webs 25, and having tubular heating elements 26 and 26ª extending transversely through said air passages for the passage of the steam.

The thermal-responsive means 21 preferably consists of a thermopile composed of a multiplicity of sets of insulated members or wires 27 and 28, each set constituting a thermo-couple and being connected together alternately in series to form a set of hot junctions 29 and a set of cold junctions 30. The wires 27 and 28 are composed of metals which differ, one thereof, such as iron, being electro-positive, and the other thereof, such as a suitable alloy of nickel and copper, being electro-negative. The particular type of radiator shown affords excellent means for suspending the thermopile therefrom, and as shown, the successive loops 27—28 are suspended by their hot junctions 29 alternately from the upper heating elements 26 and 26ª and extend downwardly through the air passages 24 and a substantial distance below the same into the space or environment at the lower end of the radiator casing 12ª, which is substantially at room temperature. The cold junctions 30 are preferably insulated from the direct radiation of element 12 by means of a baffle or screen 31 of heat insulating material, and the length of said wires or members 27 and 28 is such that the heat conducted thereby from the radiator 12 is dissipated or lost before it can reach the cold junctions 30.

The thermo-couples 27—28 employed should be sufficient in number and so distributed over the radiator as to truly reflect the difference between what is designated or called herein as the "average radiator temperature" and the room temperature, and to develop the voltage required to control the system at 100% output of the radiator. The voltage developed by each thermo-couple 27—28 is proportional to the difference in temperature between the hot junction 29 thereof and the cold junction 30 thereof, and the total voltage will be the sum of the individual voltages and proportional to the difference between the average radiator temperature, as herein understood, and the temperature of the environment, surrounding space, or room, and said resultant voltage is approximately or practically proportional to the radiator output, the approximation being sufficiently close to allow adequate control of the radiator output by our method in practice.

The voltages developed by the thermopile 21 are conducted through leads 32 to control box 33 (Figs. 1 and 7) provided with the ammeters 34 and 35, both having the scales thereof calibrated to give readings of the radiator output in percentages, and the indicated reading of the ammeter 35 being controlled either manually by the knob 36, or automatically by the means 37 responsive to temperature differences proportional to the heat losses from the building, and indicative of outside weather conditions, as hereinafter described.

The control box 33 contains the required circuits (Fig. 7) for setting the radiator output to accord with the indicated reading of the ammeter 35, so that the reading of the ammeter 34, and hence the radiator output, corresponds with the reading of the ammeter 35, and upon any deviation of the reading at 34 in either direction from its set value, the resultant current will actuate a suitable relay 38 of the galvanometer, differential, or other type capable of closing or opening contacts for controlling the flow of current from the line 39, through conductors 40 to a suitable motor or electromagnet 41 for energizing the same and actuating the valve 17 controlling the supply of steam or other operating fluid to the radiator or radiators.

Figure 7:
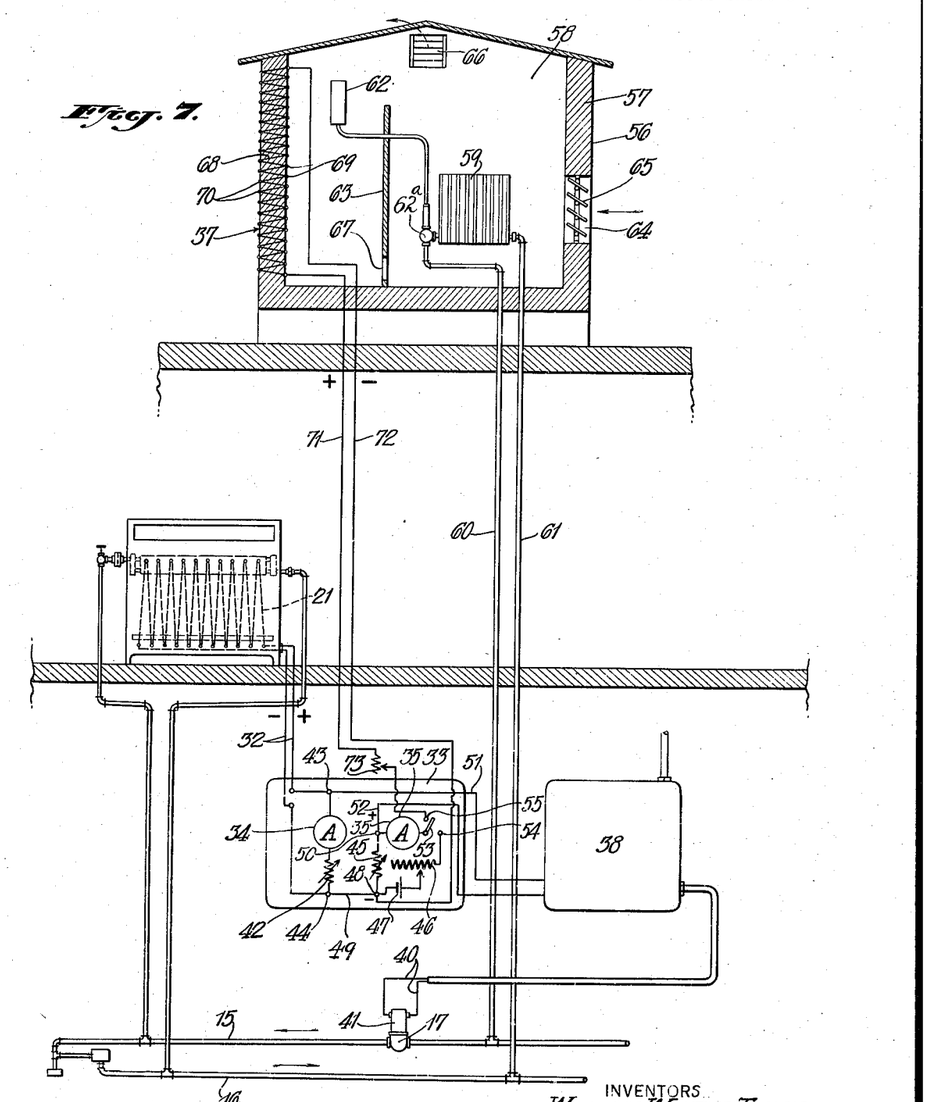
Fig. 7 is a wiring diagram of the system adapted for either manual or automatic control in accordance with outside weather conditions, as desired, certain of the parts being shown structurally.

The control box circuits comprise the ammeter 34 and resistance 42 in series connected at the ends 43, 44 with the thermopile 21 through the leads 32, the resistance 42 being adjusted in value so that the current variations through ammeter 34 are coordinated with the radiator output to give the correct readings at 34 throughout the output range. The potential drop across 43—44 is directly proportional to the radiator output.

The potential drop across 43—44 is balanced or opposed by a potential drop across a resistance 45 which is in series with the ammeter 35, adjustable resistance 46, controlled by knob 36 (Fig. 1), and a suitable source of current, such as a battery 47. The resistance 43—44 at the end 44 and the resistance 45 at the end 48 are connected together through a conductor 49. The terminals of the relay 38 are connected to the opposite ends 43 and 50 of the opposing resistances 43—44 and 45 through the conductors 51 and 52.

The circuit above described is provided with a switch 53 adapted to engage a contact 54 to place the resistance 46 and battery 47 in circuit with the ammeter 35 and resistance 45, or, if desired, to engage a contact 55 to place the automatic control 37 into operative relation thereto and disconnect the manual control.

The automatic control 37 comprises a control cabin or key room 56 located so as to be subject to all of the prevailing factors of weather conditions and including the walls 57 enclosing a chamber 58 adapted to be maintained at the desired room temperature, say, 70° F., by a suitable heating device 59, such as the radiator shown, connected at one end by the pipe 60 to the main supply pipe 15 at the inlet side of the valve 17, so as not to be affected by the operation thereof, and at its opposite end by the pipe 61 with the return 16. The cabin temperature is maintained substantially constant by the thermostat 62 controlling a thermostatically operated valve 62ª for regulating the supply of heating fluid to the radiator 59, and said thermostat is screened or protected from the direct radiation of the heating device 59 by the screen or barrier 63. The temperature conditions are maintained uniform throughout the cabin, and particularly within the space where the thermostat 62 is located by the provision of means for ventilating the cabin, including an air inlet 64 into the lower portion of the cabin controlled by the adjustable louvres 65 and a similarly controlled outlet 66 contiguous to the top of the cabin. The lower end of the partition 63 is also provided with openings 67 for facilitating circulation of air into the space occupied by the thermostat 62.

The thermo-responsive element 68 preferably consists of a thermopile responsive to the difference between the temperature of the chamber 58 or wall surface temperature thereof and the outside temperature or outer wall surface temperature, and preferably consists of a multiplicity of thermo-couples embedded in the wall 57 with the hot junctions 69 thereof lying preferably slightly below the inner surface of the wall and with cold junctions 70 thereof lying slightly below the outer surface of the wall, and generating a current proportional to the difference in temperatures between the inner and outer surfaces, which difference more truly reflects the sum total of all factors of weather condition, and is proportional to the rate of heat loss through the wall which corresponds with the rate of heat loss from the building. One end of the thermopile 68 is connected by lead 71 to the switch contact 55 and the other end of said thermopile is connected by lead 72 with the resistance 45 at the point 48. The lead 71 is preferably provided with an adjustable resistance 73 providing a manual micrometer adjustment of the automatic circuit to obtain greater accuracy in operation, and to vary slightly the required output called for by the control means 37. This adjustment will compensate for conditions such as over radiation or under radiation of the building, and enables the person in charge of the heating system to make the setting at 73 lower or higher, as he deems best.

The corresponding members or wires of the thermo-couples making up the thermopile 68 should be of sufficient length to dissipate the heat conducted thereby from the hot ends 69 before said heat can reach the cold junctions 70.

The thermopile 68 should also comprise a sufficient number of thermo-couples in series with the electropositive and electronegative elements thereof so arranged as to develop the potential drop across 48—50 required for a radiator output of 100%. The variable current generated by the thermopile 68 is the equivalent of and performs the same function as the current generated by the battery 47, which is varied manually by adjustment of resistance 46. Inasmuch as the range of variation of the temperature difference immediately below the surfaces of the wall where the junctions 69 and 70 of the thermopile 68 are located, only varies over a range, say, of 35 degrees for an outdoor variation of from 0° F. to 70° F., and the range of temperature difference at the thermopile 21 varies over a greater range, in order to develop sufficient voltage at 68 to be available for opposing and balancing the voltage developed at 21, we employ a greater number of thermo-couples in the pile 68 than in the pile 21. For example, we have found in practice that 49 thermo-couples in series disposed upon the control radiator develop sufficient voltage to satisfy the requirements of the invention, and provide a sufficient number of points of contact distributed over the radiator to indicate the average radiator temperature, the voltage developed at 100% output with this arrangement being of the order of .196 volt. To oppose this voltage we find that the use of about 470 thermocouples for the thermopile 68 are satisfactory to develop the required opposing voltage, say, .294 volt at zero weather, requiring 100% radiator output. These figures are applicable to a condition where with a zero degree to 70° F. outdoor to indoor temperature difference, there is a surface to surface difference of substantially 35° F. These values, however, will vary with the nature of the installation, such as the length or resistance of the leads, the value of the adjusted and variable resistances, and the resistances of the ammeters.

To satisfy the requirements, the voltages generated must be such that the potential drop across 43—44 can be equalized with the potential drop across 50—48 at all radiator outputs, and upon slight variation from this balance be capable of actuating the relay 38.

With the switch 53 in contact with 54, the operation of the apparatus is substantially as follows:

The electro-positive and electro-negative elements 27 and 28 are so arranged alternately that the potential drop across 43—44 caused thereby is opposed to the potential drop across the resistance 45, due to the battery 47, a 1.5 volt battery being ample for this purpose.

For a given difference in the radiator and room temperatures, the thermopile 21 develops a proportional voltage drop across 43—44, which is indicated by the ammeter 34 directly in terms of radiator output. In order to set the system to automatically maintain a predetermined or desired radiator output, the resistance 46 is adjusted by knob 36 until the ammeter 35 indicates the output desired. The potential drop across the resistance 45 will then be equal to that desired across 43—44 corresponding to the radiator output desired.

As long as the voltage drop through 43—44 is equal to the adjusted voltage drop through resistance 46 obtained by adjustment of the resistance 46, the two circuit portions 43—44 and 50—48, or the opposing forces or currents therein, will be exactly balanced and no current will flow to the relay 38, the points 43 and 50 being at the same potential. Should now the temperature difference between the radiator and the room, or the output, decrease from the desired value, the balance is upset because the thermo-current voltage decreases and current flows from the point 50 to point 43 through the relay 38 to make contact, causing actuation of the valve 17, allowing the heating fluid to flow to replenish the heat lost by the radiator or room and reestablish the balance and output value. The valve 17 remains open until the current to the relay 38 ceases or is reversed upon increase of the current value or voltage across 43—44 to a value equal to or greater than that across 45, whereupon the motor 41 is controlled to close the valve 17.

In our invention the system can be set for operation at any desired output by simply turning the knob 36 until the ammeter 35 indicates the output desired, suitable for the prevailing weather conditions outside, or for the time of day. The superintendent, janitor, or engineer in charge of the control will soon become very proficient in setting the system to supply heat at a rate to balance the heat loss from the building for various weather conditions, and thereby maintain desirable temperature conditions in the building.

If, after a setting has been made, the voltage drop across 43—44 becomes for any reason less than the voltage drop across 50—48, as determined by the setting provided by resistance 46, the valve 17 opens or remains open and heat is supplied to the radiator or radiators continuously until the two voltage drops are balanced, whereupon the valve 17 closes. If the voltage drop across 43—44 is too great after making a setting, the valve 17 remains closed, or becomes closed until a balance is established. After a balance is once established for any given output setting, any slight deviation from the balance one way or the other will control the valve 17 to reestablish promptly said balance in a relatively short interval of time not exceeding a few moments. Hence, we are able to maintain a substantially constant room temperature which, for normal weather conditions, is substantially a straight line. Further, we are able by our system and method to maintain radiator temperatures always higher than temperatures in the room, and after a balance has been obtained, as above described, the radiator temperature will not deviate or swing from a mean value in either direction during the cycle of operation of the valve 17 more than a few per cent. Change in radiator temperature of two or three degrees in either direction is immediately effective for reestablishing the balance, and such slight change will have no appreciable effect on the room temperature, which remains constant. We are thus able to maintain substantially constant temperature differences between the radiator and the room, and hence maintain constant radiator outputs.

Should it be desirable to rely on the automatic control 37 for setting the radiator output, the switch 53 is moved to disengage contact 54 and to engage contact 55. With the circuits thus arranged, the voltage drop across resistance 45 is proportional to the voltage developed by the thermopile 68, which is proportional to the difference in temperature between the inner and outer surfaces of the walls 57, the rate of heat loss from the cabin being proportional to this difference in temperature and being representative of the rate of heat loss from the building. The variations in voltage drop across 50—48 occurring as the temperature of the outside surface of the wall 57 varies between its limits, are coordinated with the ammeter 35, so that, for the various weather conditions outside, the ammeter 35 indicates the particular radiator output desirable for the given weather conditions, and as the temperature of the outer surface of the wall varies, say, from zero to 70°, the ammeter 35, if employed, will indicate the required radiator output for such conditions. Assuming, for example, that the system is balanced for a particular output, and the outside weather conditions change, causing the temperature of the outer surface of the wall to suddenly drop, thereupon there will be an increase in voltage drop across 50—48 and the system becomes unbalanced to cause opening of the valve 17 for supplying heat until the potential drop across 43—44 balances the increase in potential drop across 50—48. Thereupon a new balance is established to maintain a greater radiator output for balancing the increase in heat loss from the building resulting from the change in weather conditions. Upon increase in temperature of the outer surface of the cabin wall, the valve 17 closes and the system balances to reduce the radiator output.

In our system or method of control of the radiator output, we are able to maintain substantially the same, or relatively the same, radiator outputs, i. e., the same or relatively the same percentages of outputs compared to the maximum for which the radiators are designed, for all the radiators of the system or zone by means of a single control radiator. Upon the setting of the control radiator for a given output, the other radiators, such as 13 and 14, are maintained at corresponding outputs, and correspondingly vary in output with variation in the output of the control radiator.

The valve 17, operating at a rate to maintain the adjusted radiator output, remains closed as long as the voltage of the thermopile 21 is balanced by or exceeds that of the opposing voltage, and remains open as long as the opposite condition prevails. The duration of the cycle, including the closed interval and the open interval, is but a few minutes, and inasmuch as the operation occurs in response to slight changes in the temperature difference, the radiators never heat up or cool down excessively, or to an extent noticeable as uncomfortable, thereby maintaining a substantially moderate mean radiator temperature. Further, in our invention the control is sufficiently sensitive to minimize overshooting of the radiator temperature when the valve 17 opens, and undershooting when the valve 17 closes so that the percentage variation in radiator temperature in either direction from its mean value is kept within limits, having substantially no noticeable effect on the room temperature which remains substantially constant, the graphic curve thereof for prevailing constant weather conditions for which the system is regulated or set, being approximately a straight line.

In our method or system, the output of the radiators is controlled as a function of temperature difference instead of as a function of temperature and is proportional to the difference between the average radiator temperature and the room temperature. It follows therefore that as long as this difference in temperature is the same in the several rooms 11 in which the radiators are located, the temperature of the rooms may differ without affecting the uniformity in radiator output. For example, assume that the control radiator 12 is adjusted for a 50% radiator output, and the temperature of the room in which the control radiator is located is 40°, the radiator temperature will balance, say, at 110°, the difference being the 70 degrees estimated to be required for maintaining a 50% output. At the same time the other radiators balance at 50% output, even though the room temperatures in which such radiators are located are higher, say, 70°. In such event the radiator temperature will be at 140° but the difference in temperatures will be the same as the difference at the control radiator, i. e., 70 degrees. Change of the temperature in any of the rooms by the occupants thereof, such as by opening a window, will have no effect upon the radiator output of the particular room, or of the system as a whole. If the room temperature drops 20° upon opening of a window, the radiator temperature drops a like amount, to maintain the same difference in temperature, and hence the same output.

If the output adjustment is too high for outside temperature conditions, the room temperature will rise, and this will be accompanied by a corresponding rise in radiator temperature, thus always maintaining the radiator temperature higher than the room temperature, and the radiator at the desired output, until the heat loss from room to the outside of the building is balanced. If the room temperature resulting from the excess adjustment is too high for comfort, the system can be readjusted in output to give the required room temperature. It will also be noted that with rise in outside temperature, resulting in rise in room temperature, the radiator temperature, unless compensation is made by the control 37, will also rise to maintain the temperature difference corresponding to the output, so that the radiator, even under these conditions, is always warmer than the room. If the room becomes too warm for comfort, readjustment of the output manually may be made.

In our method or system we are able to maintain desirable equality in radiator outputs for all radiators in response to control by a single radiator, and hence maintain radiator temperatures within temperature limits of the heat exchange fluid which are always higher than the room temperatures, and which do not vary appreciably from a mean value even though the steam be supplied intermittently. Our system therefore satisfies the requirements as to room comfort and obviates complaints on the part of the occupants, and, being entirely under the control of the building attendants, the system can be adjusted for maximum economy without detriment thereto by interference on the part of the occupants.

Utilizing our invention, all the radiators operate simultaneously and economically at outputs adjusted to the weather conditions, regardless of the capacity of any radiator or the distance thereof from the point of steam introduction into the system, and the steam supply to the radiators being always under control to satisfy the output requirements under all weather conditions, steam can be supplied economically at all outputs without exceeding the radiator capacity at maximum output.

What we claim and desire to secure by Letters Patent of the United States is:—

1. The method of controlling a heat exchange element, which comprises developing a current proportional to the difference in temperature between the heat exchange element and its surroundings, balancing said first current by another current at a value corresponding to a desired heat exchange rate, and controlling the supply of operating fluid to said element in response to current variations from said balanced value.

2. The method of controlling a heat exchange element, which comprises generating a thermocurrent proportional to the heat exchange rate of said element in response to the difference between the temperature of said element and the temperature of its surroundings, balancing said thermocurrent by another current at a value corresponding to a predetermined heat exchange rate, and supplying the operating fluid to said element in response to variation from said balanced value.

3. The method of controlling a heat exchange element, which comprises developing a force proportional to the heat exchange rate of said element, developing a second force proportional to the rate of heat transfer through the walls of a building, balancing said first force by said second force for operating said element at heat exchange rates corresponding to the value of the balanced forces, and controlling the supply of operating fluid to said element in response to variations of said forces.

4. The method of controlling a heat exchange element, which comprises developing a force proportional to and varying with the difference between the temperature of the element and the temperature of its surroundings, developing a second force proportional to and varying with a temperature difference proportional to the rate of heat transfer through the walls of a building, balancing said first force by said second force for operating said element at heat exchange rates corresponding to the value of the balanced forces, and controlling the supply of operating fluid to said element in response to variations of said forces.

5. The method of controlling heat exchange systems, which comprises maintaining substantially the same relative heat exchange rates for a plurality of heat exchange elements of the system by supplying the operating fluid thereto through sized orifices and at a design pressure, and effecting the delivery of said fluid to the elements intermittently in response to variation in a force proportional to the heat exchange rate of one of the elements and balanced for operation at a particular rate thereof.

6. In a heat exchange system, a heat exchange element, a thermopile having certain of the junctions thereof associated with said heat exchange element to register the temperature thereof and other of the junctions thereof disposed to register the temperature of the space about said element, a circuit therefor, a balancing circuit, means operated by variation of the currents from balanced relation for controlling the supply of operating fluid to said heat exchange element, and a device in said first circuit calibrated to indicate the heat exchange rate of said element.

7. In a heat exchange system, a heat exchange element, means for developing a thermo-current substantially proportional to the heat exchange rate of said element, means for causing an opposing current variable to balance the first current at values corresponding to various heat exchange rates, and means responsive to current variations from balanced relation for controlling the supply of operating fluid to said element.

8. In a heat exchange system, a radiator, a thermopile including a multiplicity of thermocouples suspended from said radiator, said thermopile having the hot junctions thereof distributed over said radiator to register the average temperature thereof and the cold junctions disposed below said radiator and insulated therefrom to register the temperature of its surroundings, and developing a current substantially indicative of the heat exchange rate of said element.

9. In a heat exchange system, a heat exchange element, means for causing variation in a medium proportional to variation in heat exchange rate of said element, means for causing variation in a medium proportional to variation in the rate of heat transfer through the walls of a building, said two means being disposed to balance one medium by the other, and means operated by variation in said mediums from balanced relation for controlling the supply of operating fluid to said element.

10. In a heat exchange system, a heat exchange element, a thermopile circuit developing a current proportional to the difference in temperature between the heat exchange element and its surroundings, a circuit for causing a potential drop balancing a potential drop in said first-named circuit, means for varying the current in said second circuit for determining the potential drop therein, and means responsive to variation in potential drop from balanced relation for controlling the supply of operating fluid to said element.

11. In a heat exchange system, a thermopile sensitive to differences in temperature, means for opposing a variable balancing potential drop against a potential drop produced by the thermopile, and a control device operated in response to variation in potential drop from balanced relation.

12. In a heat exchange system, a heat exchange element, a thermopile arranged with one set of junctions in or about said element and with the other set of junctions within the space about said element, means for opposing a potential drop against a potential drop produced by said thermopile, and means for controlling said element in accordance with variation of said potential drops relative to each other.

13. In a heat exchange system for a building, means for supplying an operating fluid to the system, and means including a thermopile responsive to a temperature difference proportional to the rate of heat transfer through the wall of the building for controlling said first-named means.

14. In a heat exchange system for a building, means for controlling the supply of operating fluid to the system including a thermopile embedded within a wall and having the junctions thereof disposed contiguous to the wall surfaces.

15. In a heat exchange system for a building, means for supplying operating fluid to the system, a key room, thermostatically controlled heating means therein for maintaining said key room at a predetermined temperature, and means for controlling said fluid supplying means including a thermopile embedded within the wall of said key room and having the junctions thereof disposed to be responsive to the difference in temperature between the inner and outer surfaces of the wall of said key room.

16. In a heat exchange system, a heat exchange element, means for generating a thermo-current proportional to the difference in temperature between the element and its surroundings, means for generating a thermo-current proportional to a difference in temperature reflecting the rate of heat transfer between the inside and outside of a building, said second means being coordinated with said first means so that a potential drop in the second balances a potential drop in the first, and means responsive to variation in said potential drops for controlling the supply of operating fluid to said element.

17. In a heat exchange system, a heat exchange element, means for causing variation in a medium proportional to the difference in temperature between said element and its surroundings, and indicative of the heat exchange rate of said element, a device included in said means for indicating the heat exchange rate, means for causing variation in a medium for balancing said first-named medium at values corresponding to various heat exchange rates and including a device therein for indicating the heat exchange rate corresponding to the various values of said second medium, and means responsive to variations of said mediums from balanced relation for controlling the supply of operating fluid to said element.

18. In a heat exchange system, a plurality of heat exchange elements having orifices sized to proportion the supply of operating fluid thereto, and including a line for supplying said fluid thereto at design pressure, valvular means associated with said line, and means responsive to variations in the heat exchange rate of one of said elements for intermittently controlling said valve for correspondingly controlling the heat exchange rates of all of said elements.

19. The method of controlling a heat exchange element within a building, which comprises varying a force directly with and in response to variations in temperature difference between the heat exchange element and the building space substantially over the range of variation of outside weather conditions, and controlling the supply of operating fluid to said element in response to variations in said force from a balanced value substantially corresponding to the heat exchange rate satisfying the outside weather conditions.

20. The method of controlling a heat exchange element within a building, which comprises developing a force varying directly with and in response to the variations in a temperature difference reflecting the heat exchange rate between the inside and the outside of the building and in proportion to the heat exchange rate of said heat exchange element, and controlling the supply of operating fluid to said element in accordance with the value of said force for maintaining a heat exchange rate corresponding thereto.

21. The method of controlling a heat exchange element for a building, which comprises varying a force in response to the variations in a temperature difference reflecting the heat transfer rate through the walls of the building, varying another force in response to the variations in the heat exchange rate of said element, said forces having substantially the same range of variation, opposing said forces, and controlling the supply of operating fluid to said element in response to variations in said forces.

22. The method of controlling a heat exchange element within a building, which comprises varying an electric current directly with and in response to variations in a difference in temperature reflecting the heat exchange rate between the inside and the outside of the building substantially over the range of outside weather conditions, and balancing the heat exchange rate of said heat exchange element at a value corresponding to the value of said current.

23. The method of controlling a heat exchange element within a building, which comprises varying an electric current directly with and in response to variation in a difference in temperature reflecting the heat transfer rate between the inside and the outside of the building substantially over the range thereof, and controlling the supply of operating fluid to said heat exchange element in response to the variations in said current for maintaining a heat exchange rate proportional to the value of said current.

24. The method of controlling a heat exchange element within a building, which comprises varying an electric current directly with and in response to variations reflecting the rate of heat transfer between the interior of the building and the outside thereof, varying an electric current directly with and in response to variations in the heat exchange rate of said heat exchange element, opposing said currents to balance at the desired heat exchange rates, and controlling the supply of operating fluid to said element in response to the variations in said currents.

25. The method of controlling a heat exchange element within a building, which comprises developing a thermo-electric current varying directly with and in response to variations in a difference in temperature reflecting the heat transfer rate between the inside and the outside of the building, and balancing the heat exchange rate of said heat exchange element at a value corresponding to the value of said thermo-electric current.

26. The method of controlling a heat exchange element within a building, which comprises developing a thermo-electric current varying directly with and as a measure of variations in the temperature difference between the inside and the outside of the building substantially over the range thereof, and balancing the heat exchange rate of said heat exchange element by and in accordance with the value of said thermo-electric current.

27. The method of controlling a heat exchange element within a building, which comprises developing a thermo-electric current varying directly with and in response to variations in a difference in temperature reflecting the inside and the outside temperature conditions, developing a thermo-electric current of corresponding range varying directly with and in response to variations in the difference in temperature between the heat exchange element and the building space, opposing said currents, and controlling the supply of operating fluid to said element in response to variations in said thermo-electric currents.

28. The method of controlling a plurality of heat exchange elements within a building, which comprises supplying operating fluid in relative proportions to all of said elements for maintaining substantially the same relative heat exchange rates substantially throughout the operating range thereof, varying a force substantially directly with and in response to variations in the heat exchange rate of one of said elements, balancing said force at a heat exchange rate corresponding to the outdoor weather conditions, and controlling the supply of operating fluid to all of said elements in response to variation of said force from balanced value.

29. The method of controlling a plurality of heat exchange elements within a building, which comprises supplying operating fluid to all of said elements under design pressure and in proportions for maintaining the differences in temperature between said elements and the corresponding spaces occupied thereby relatively the same substantially throughout the operating range of said elements, varying a force directly with and in response to the variations in output of one of said elements, balancing said force by another force proportional to the rate of heat transfer through the walls of the building, and controlling the supply of operating fluid under design pressure to all of said elements in response to variation of said forces.

30. The method of controlling heat exchange systems for buildings, which comprises supplying steam under design pressure through sized orifices to a plurality of heat exchange elements substantially throughout the operating range of the system for maintaining the outputs of said elements relatively the same throughout said operating range, the steam to said elements being supplied under design pressure intermittently in response to the variations in a force adapted to vary directly with and in response to the variations in output of one of said elements, and balanced at a value corresponding to the desired output.

31. In a heat exchange system for a building, a heat exchange element, a plurality of means disposed in opposing relation to each other and respectively responsive to the variations in the heat exchange rate of said element and in the heat transfer rate between the inside and the outside of the building substantially over the range of weather conditions, one of said means in responding developing a force proportional to the heat exchange rate of said heat exchange element and the other means in responding developing an opposing force of the same range for balancing said first force, and means responsive to variations in said balanced forces for controlling the supply of operating fluid to said element.

32. In a heat exchange system for a building, an outside enclosure, thermostatically controlled heating means therein for maintaining the space within said enclosure at a predetermined constant temperature, means including a thermopile having one set of junctions exposed to the temperature of the space within said enclosure and the other set of junctions exposed to the outdoor weather conditions for developing a thermocurrent therein proportional to the difference in temperature between the two sets of junctions, means for developing a force proportional to the heat exchange rate of the system and balancing said force at a value corresponding to the value of said thermo-current, and means for controlling the supply of operating fluid to the system in response to the variations of said force from balanced value.

33. In a heat exchange system for a building, a heat exchange element, a thermopile associated with said heat exchange element and exposed to the temperature thereof and the temperature of the space occupied thereby, said thermopile developing a thermo-current proportional to the heat exchange rate of said element, a thermopile reflecting the difference in temperature between the inside and the outside of the building, said second thermopile developing a thermo-current of substantially the same range as said first thermo-current, means for balancing said thermo-currents one against the other, and means responsive to the variations of said thermo- currents for controlling the supply of operating fluid to said heat exchange element.

34. In a heat exchange system, a plurality of heat exchange elements including a line for supplying operating fluid thereto at design pressure, said elements and said line being designed to maintain substantially the same relative heat exchange rates throughout the operating range of said elements, means for causing variation in a force directly with and in response to the variations in the heat exchange rate of one of said elements, means for balancing said force at a desired heat exchange rate, and means responsive to variation of said force from balanced value for controlling the supply of operative fluid to all of said elements.

35. In a heat exchange system, a plurality of radiators having orifices sized to proportion the supply of steam thereto so as to maintain substantially the same relative outputs throughout the radiator operating range, and including a line for supplying steam to said radiators at design pressure, an on and off valve associated with said line, means responsive to the variations in temperature difference between one of said radiators and the contiguous space, said means causing variation in a force proportional to the radiator output, means for balancing said force at a desired radiator output, and means responsive to variations in said force from balanced value for intermittently actuating said valve for controlling the supply of steam to all of said radiators.

36. The method of controlling a heat exchange element for maintaining desired temperature conditions within a building, which comprises varying a force directly with and in response to the variations in the heat exchange rate of said element substantially over the operating range of said element, balancing said force by an opposing like force capable of variation over a range corresponding to that of said first-named force and constituting a measure of the outside weather conditions, and controlling the supply of operating fluid to said element in accordance with the value of said balancing force to maintain a heat exchange rate satisfying the outside weather conditions.

37. The method of controlling a heat exchange element for maintaining desired temperature conditions within a building, which comprises varying a force as a measure of the heat exchange rate of said element substantially over the operating range thereof, varying a like force over a corresponding range as a measure of the heat transfer rate through the walls of the building as the outside weather conditions vary, balancing said forces one against the other, and controlling thereby the supply of operating fluid to said element for operating said element at heat exchange rates satisfying the weather conditions.

38. The method of controlling a heat exchange element, which comprises varying an electric current as a direct measure of the heat exchange rate of said element, varying another current of corresponding range as a measure of the desired heat exchange rate, opposing said currents, and controlling the operation of said element in accordance with the value of said second-named current.

39. In a heat exchange system for a building, a heat exchange element therein, thermo-responsive means for causing variation in a force substantially proportional to the actual heat exchange rate of said element over the operating range thereof, means for varying a like force over a corresponding range in accordance with outside weather conditions as a measure of the desired heat exchange rate, said several means being disposed to place said forces in opposition, and means responsive to said forces for controlling the supply of operating fluid to said element to maintain said forces in balanced relation.

40. In a heat exchange system for a building, a heat exchange element therein, means responsive to the difference in temperature between said element and the space occupied thereby for causing variation in a force substantially proportional to the actual heat exchange rate of said element over the operating range thereof, means for varying a like force over a corresponding range as a measure of the desired heat exchange rate, said several means being disposed to balance one force against the other, and means responsive to said forces for controlling the supply of operating fluid to said element.

41. In a heat exchange system for a building, a heat exchange element therein, thermo-responsive means for causing variation in an electric current substantially proportional to the heat exchange rate of said element, means for varying an opposing current over a corresponding range as a measure of the desired heat exchange rate to balance said first current at the heat exchange rate desired, and means responsive to current variations from balanced relation for controlling the operation of said element.

42. In a heat exchange system for a building, a heat exchange element therein, thermo-responsive means for causing variation in a force substantially proportional to the variations in the heat exchange rate of said element, thermo-responsive means for causing variations in a like force in response to changes in outside weather conditions and as a measure of the heat transfer rate through the walls of the building, means for opposing said forces, and means for controlling the operation of said element in response to variations in said forces.

43. In a heat exchange system for a building, a heat exchange element therein, means for causing variation in an electric current as a measure of the heat exchange rate of said element, means for causing variation in an electric current as a measure of the heat transfer rate through the walls of the building, means for opposing said currents for variation over corresponding ranges, and means responsive to the current variations for controlling the operation of said element.

44. In a heat exchange system for a building, a heat exchange element therein, thermo-responsive means for causing variation in a force as a proportionate measure of the heat exchange rate of said element, thermo-responsive means for causing variations in a force as a proportionate measure of the heat transfer rate through the walls of the building, means for opposing said forces for variation over corresponding ranges, manual means for adjusting the value of said second force, and means responsive to the variation of said forces for controlling the operation of said element.

45. In a heat exchange system for a building, a heat exchange element therein, an outside enclosure, heating means therein, thermostatically operated means for controlling said heating means to maintain the temperature within said enclosure substantially constant, means for developing a force proportional to the heat transfer rate through the wall of said enclosure, means for developing a force proportional to the heat exchange rate of said element, means for opposing said forces, and means responsive to the variation in said forces from balanced relation for controlling the operation of said element in accordance with the value of said first force.

WILLIAM WALTER TIMMIS.
WILLIAM K. WALKER.